US007406468B2

(12) United States Patent
Larson et al.

(10) Patent No.: US 7,406,468 B2
(45) Date of Patent: Jul. 29, 2008

(54) VIEW MATCHING FOR MATERIALIZED OUTER-JOIN VIEWS

(75) Inventors: Per-Ake Larson, Redmond, WA (US); Jingren Zhou, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

(21) Appl. No.: 11/152,740

(22) Filed: Jun. 14, 2005

(65) Prior Publication Data

US 2006/0282424 A1 Dec. 14, 2006

(51) Int. Cl.
*G06F 7/00* (2006.01)

(52) U.S. Cl. .......................................................... 707/4
(58) Field of Classification Search ........................ 707/2, 707/3, 4, 5
See application file for complete search history.

(56) References Cited

U.S. PATENT DOCUMENTS

| | | | | |
|---|---|---|---|---|
| 5,774,692 | A | * | 6/1998 | Boyer et al. ................... 707/3 |
| 5,897,632 | A | | 4/1999 | Dar et al. |
| 5,991,754 | A | * | 11/1999 | Raitto et al. ................... 707/2 |
| 6,125,360 | A | | 9/2000 | Witkowski et al. |
| 6,134,543 | A | | 10/2000 | Witkowski et al. |
| 6,438,541 | B1 | | 8/2002 | Witkowski |
| 6,484,159 | B1 | | 11/2002 | Mumick et al. |
| 6,496,819 | B1 | | 12/2002 | Bello et al. |
| 6,850,927 | B1 | | 2/2005 | Hsu |
| 6,850,933 | B2 | * | 2/2005 | Larson et al. ................... 707/4 |
| 2003/0229625 | A1 | | 12/2003 | Melchior et al. |
| 2004/0122804 | A1 | | 6/2004 | Zhang et al. |
| 2004/0122814 | A1 | | 6/2004 | Zhang et al. |
| 2006/0026154 | A1 | * | 2/2006 | Altinel et al. ................... 707/5 |

OTHER PUBLICATIONS

Larson, et al. View Matching for Outer-Join Views (2005) Proceedings of the 31st VLDB Conference, Trondheim, Norway, 12 pages.
R. Pottinger and A. Y. Levy. A scalable algorithm for answering queries using views. In Proc. of VLDB Conference, 2000. 12 pages.
J. Rao, B. G. Lindsay, G. M. Lohman, H. Pirahesh, and D. E. Simmen. Using eels, a practical approach to outerjoin and antijoin reordering. In Proc. of ICDE Conference, 2000. 10 pages.
J. Rao, H. Pirahesh, and C. Zuzarte. Canonical abstraction for outerjoin optimization. In Proc. of SIGMOD Conference, 2004. 12 pages.

(Continued)

*Primary Examiner*—Cheyne D Ly
(74) *Attorney, Agent, or Firm*—Amin, Turocy & Calvin, LLP

(57) ABSTRACT

A computer implemented system that facilitates view matching for outer join views comprises an interface component that receives at least one query that includes one or more outer join operators. A view matching-component converts the at least one query and outputs a substitute query expression. In accordance with one aspect of the subject invention, the view-matching component can comprise a normalization component that converts the at least one query and at least one materialized view into a normalized query expression and a normalized view expression. Furthermore, the view-matching component can include an analysis component that receives the normalized query expression and the normalized view expression, and a construction component that constructs the substitute query expression.

12 Claims, 9 Drawing Sheets

OTHER PUBLICATIONS

D. Srivastava, S. Dar, H. V. Jagadish, and A. Y. Levy. Answering queries with aggregation using views. In Proc. of VLDB Conference, 1996. 12 pages.

W. P. Yan and P.-A. Larson. Eager aggregation and lazy aggregation. In Proc. of VLDB Conference, 1987. 13 pages.

H. Z. Yang and P.-A. Larson. Query transformation for psj-queries. In Proc. of VLDB Conference, 1987. 10 pages.

M. Zaharioudakis, R. Cochrane, G. Lapis, H. Pirahesh, and M. Urata. Answering complex sql queries using automatic summary tables. In Proc. of SIGMOD Conference, 2000. 12 pages.

Alon Y. Levy, Alberto O. Mendelzon, Yehoshua Sagiv, and Divesh Srivastava. Anwering queries using views. 10 pages.

Oracle® Database SQL Reference; 10g Release 1 (10.1); http://64.233.161.104/search?q=cache:FXcJzDLqSjkJ:www.cis.unisa.edu.au/oracle/server.101/b10759/queries006.htm+view+matching+materialized+outer+join+views&hl=en.

Outer Joins and Filters and Instantiating Objects from Relational Databases Through Views; http://csdl2.computer.org/persagen/DLAbsToc.jsp?resourcePath=/dl/trans/tk/&toc=comp/trans/tk/1994/01/kltoc.xml&DOI=10.1109/69.273031.

Oracle8i Tuning Release 8.1.5; Query Rewrite; http://64.233.161.104/search?q=cache:-MTQ5jM15PsJ:www.csee.umbc.edu/help/oracle8/server.815/a67775/ch4.htm+view+matching+materialized+outer+join+views&hl=en.

Knowledge Base; Tip: SQL: Joins; http://64.233.161.104/search?q=cache:q_6jkTAd5oQJ:www.metroke.gov/gis/kb/Content/SQLTipJoin.htm+view+matching+materialized+outer+join+views&hl=en.

R. G. Bello, K. Dias, A. Downing, J. J. F. Jr., J. L. Finnerty, W. D. Norcott, H. Sun, A. Witkowski, and M. Ziauddin. Materialized views in oracle. In Proc. of VLDB Conference, 1998. 6 pages.

G. Bhargava, P. Goel, and B. R. Iyer. Hypergraph based reorderings of outer join queries with complex predicates. In Proc. of SIGMOD Conference, 1995. 12 pages.

J.-Y. Chang and S.-G. Lee. Query reformulation using materialized views in data warehouse environment. In Proc. of DOLAP, 1998. 6 pages.

S. Chaudhuri, R. Krishnamurthy, S. Potamianos, and K. Shim. Optimizing queries with materialized views. In Proc. of ICDE Conference, 1995. 25 pages.

C. Galindo-Legaria. Outerjoins as disjunctions. In Proc. of SIGMOD Conference, 1994. 19 pages.

C. Galindo-Legaria and A. Rosenthal. Outerjoin simplification and reordering for query optimization. ACM Transactions on Database Systems., 22(1), 1997. 32 pages.

P. Goel and B. R. Iyer. Sql query optimization: Reordering for a general class of queries. In Proc. of SIGMOD conference, 1996. 10 pages.

J. Goldstein and P.-A. Larson. Optimizing queries using materialized views: A practical, scalable solution. In Proc. of SIGMOD conference, 2001. 12 pages.

P.-A. Larson and H. Z. Yang. Computing queries from derived relations. In Proc. of VLDB Conference, 1985. 32 pages.

A. Y. Levy, A. O. Mendelzon, Y. Sagiv, and D. Srivastava. Rewriting aggregate queries using views. In Proc. of PODS Conference, 1995. 12 pages.

Alon Y. Levy, Alberto O. Mendelzon, Yehoshua Sagiv, and Divesh Srivastava. Anwering queries using views. 10 pages. Proceedings of the 22nd VLDB Conference Mumbai (Bombay), India, 1996, pp. 318-329.

Oracle® Database SQL Reference; 10g Release 1 (10.1); http://64.233.161.104/search?q=cache:FXcJzDLqSjkJ:www.cis.unisa.edu.au/oracle/server.101/b10759/queries006.htm+view+matching+materialized+outer+join+views&hl=en, 2005.

Outer Joins and Filters and Instantiating Objects from Relational Databases Through Views; http://csdl2.computer.org/persagen/DLAbsToc.jsp?resourcePath=/dl/trans/tk/&toc=comp/trans/tk/1994/01/kltoc.xml&DO1=10.1109/69.273031, 2005.

Oracle8i Tuning Release 8.1.5; Query Rewrite; http://64.233.161.104/search?q=cache:-MTQ5jM15PsJ:www.csee.umbc.edu/help/oracle8/server.815/a67775/ch4.htm+view+matching+materialized+outer+join+views&hl=en, 2005.

Knowledge Base; Tip: SQL: Joins; http://64.233.161.104/search?q=cache:q_6jkTAd5oQJ:www.metroke.gov/gis/kb/Content/SQLTipJoin.htm+view+matching+materialized+outer+join+views&hl=en, 2005.

* cited by examiner

VIEW MATCHING FOR MATERIALIZED OUTER-JOIN VIEWS

BACKGROUND

Modern databases can contain large amounts of information, amounting to hundreds of gigabytes, if not many terabytes of data, the majority of which is stored in the form of large tables. Consequently, despite a vast array of computing power and advancements of modern computer platforms, queries against large databases can take a considerable amount of time to complete; in the order of several hours is not unusual. Thus, it is well understood that queries against large databases can be computationally intensive as a consequence of the magnitude of data that must be processed and manipulated and because the data manipulation necessary to facilitate a query can be computationally complex and expensive.

In order to reduce the computational tasks and overhead necessary to extract useful information from a database, a number of techniques have been developed, such as the utilization of materialized views and the optimization of user queries, for example. A materialized view, also known as an indexed view, is a mechanism for expediting query processing. In more detail a materialized view is pre-computed so that such materialized view can be utilized to compute a series of queries, an individual query, or a sub-query, rather than rendering a result ab initio from base tables each and every time that the series of queries, individual query, or sub-query, is executed against a database. Currently, most major database systems provide support for materialized views. Query optimization, on the other hand, involves rewriting a user's query into an optimized query by way of substitution of equivalent but less computationally intensive queries/expressions. Utilization of these techniques in conjunction, for instance, can facilitate significant efficiency gains and consequently an appreciable reduction in computational power and time necessary to render query results.

Although materialized views either alone or in combination with query optimization can provide dramatic improvements in query processing time, the synergistic improvements of the combination of materialized views with query optimization manifest themselves only when the query optimizer is able to determine when and how a query or sub-query can be computed from a particular materialized view(s). The problem of determining whether and how a query or subquery can be computed from a materialized view is known as the view matching problem.

To date, systems and methods for view matching have been confined to materialized views defined by expressions consisting of projection, selection and inner joins with an optional group-by operator on top (PSJG views). In contrast, view matching in the context of materialized views expressed as projections, selections and outer joins with the possible addition of an aggregation operator, or group-by operator, on top (PSOJG views), has yet to be satisfactorily addressed. Since many user queries and sub-queries utilize both inner joins as well as outer joins, and the lack of a solution to the view matching problem for PSOJG views, the potential efficiency gains offered by such materialized views have not been available to these types of queries.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention as disclosed and claimed herein relates to extending view matching to views and queries containing outer joins. By converting expressions into join-disjunctive normal from, one or more aspects of the subject invention enable reasoning about semantic equivalence and subsumption instead of being based on a bottom-up syntactic matching of expressions. Therefore, in accordance with one aspect of the subjection invention, a computer-implemented system facilitates view matching of outer join views queries. In more detail, an interface component can receive at least one query expression that includes one or more outer join operators, and a view-matching component that can determine whether all or part of the at least one query expression can be computed from one or more existing materialized views and outputs substitute query expressions that can make use of one or more materialized views. The view-matching component can further include a normalization component that can convert query expressions and materialized view expressions into a join-disjunctive normal form.

The view-matching component can still further include an analysis component that receives the normalized query expression and the normalized view expression. The analysis component can thereupon determine whether the normalized query expression is subsumption-contained by the normalized view expression. The analysis component in addition can verify that each term contained in the normalized query expression is recoverable from the view. Further, the analysis component can ascertain which residual predicates, that is, query predicates contained within the normalized query expression, can be applied to the view in order to render a correct substitute query, and can further determine whether all the columns utilized by the residual predicates and the output expressions are available in the generated view output. If the aforementioned conditions are satisfied, a substitute query expression is generated by a construction component.

In accordance with another aspect of the subject invention, a computer-implemented method that facilitates view matching of outer join views is provided. The method includes receiving query expressions that can comprise selection operators, predicates, projection operators, and join operators, some of which may be outer-join operators, effectuating a computer to access materialized view definitions that are contained within a database, and thereupon converting the accessed materialized view definitions and the received query expression into join-disjunctive normalized form. The method can further cause a computer to analyze the converted query expression to determine whether it is possible for the normalized query to be converted and rendered into an substitute query expression that can utilize one or more materialized views.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
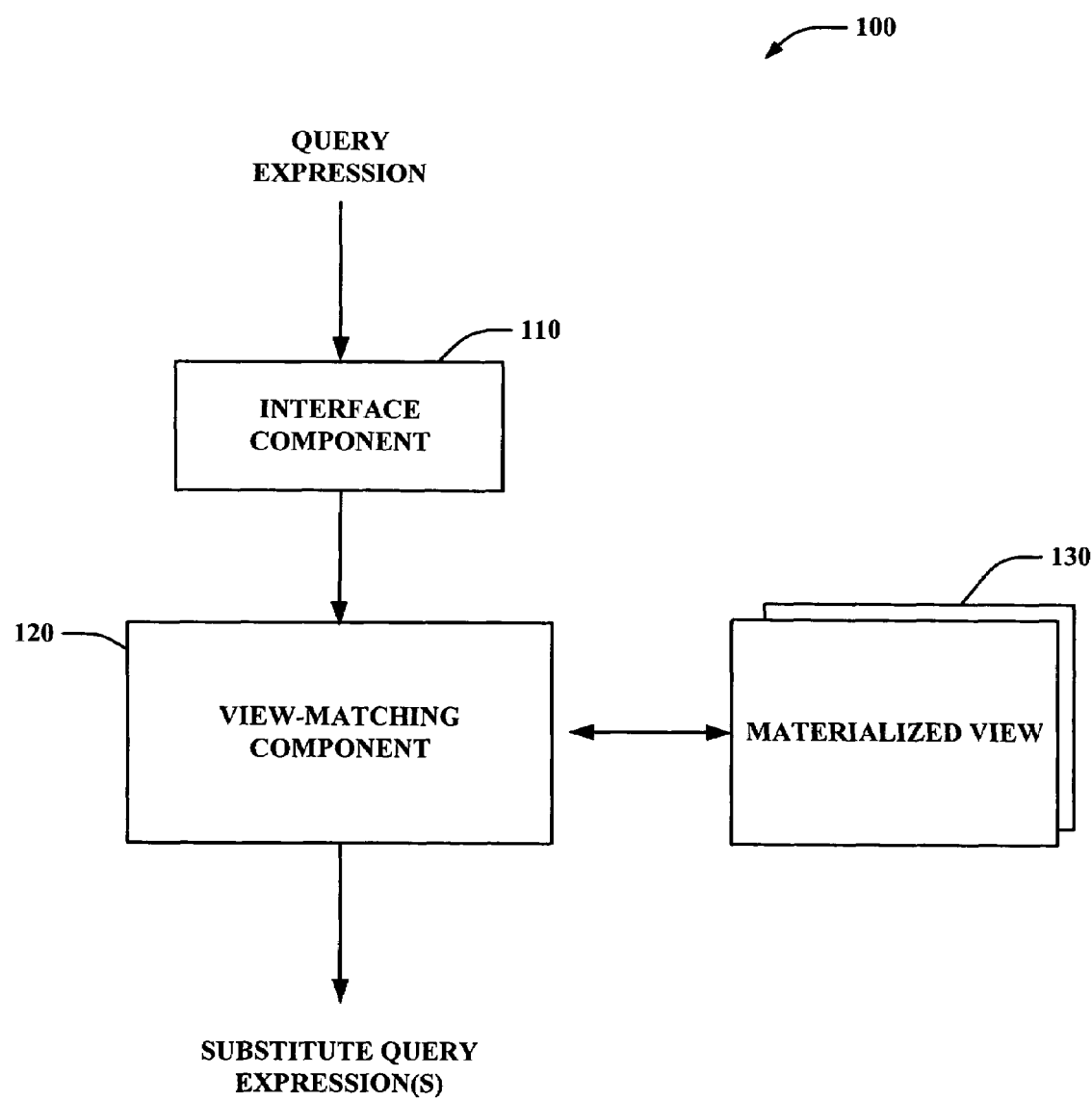
FIG. 1 illustrates a system that facilitates view matching for outer join views and/or queries.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

The following terms are used throughout the description, the definitions of which are provided herein to assist in understanding various aspects of the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, a selection operator is denoted as $\sigma_p$ where p is a predicate. A projection operator (without duplicate elimination) is denoted by $\pi_c$ where c is a list of columns. T denotes a single table or a set of tables, and T.* denotes all columns of table(s) T. In addition, an operator that removes duplicates (similar to SQL's select distinct), is denoted as $\delta$.

In addition, as used herein a predicate p referencing some set S of columns is said to be strong or null-rejecting if it evaluates to false on a tuple as soon as one of the columns in S is null. Further, as used herein a special predicate null(T) evaluates to true if a tuple is null-extended on base table T. Thus for example, ~null(T) can be implemented in SQL as "T.c is not null" where c is any column of T that is not nullable.

Moreover, as defined herein, a schema S is a set of attributes (column names). Thus, for instance, if T1 and T2 are tables with schemas S1 and S2, respectively, an outer union can therefore be denoted by T1 ⊎ T2, where the operator first null-extends (pads with nulls) the tuples of each operand to schema S1∪S2 and then takes the union of the results (without duplicate elimination). An outer union has lower precedence than join, e.g., joins should be evaluated before outer unions.

Thus, if T1 and T2 are tables with disjoint schemas S1 and S2 respectively, and p is a predicate referencing a subset of columns in S1∪S2, the (inner) join of the tables can be defined as $T_1 \bowtie_p T_2 = \{(t_1, t_2) | t_1 \in T_1, t_2 \in T_2, p(t_1, t_2)\}$. The anti (semi) join can be represented as $T_1 \triangleright_p T_2 = \{t_1 | t_1 \in T_1, (\nexists t_2 \in T_2 | p(t_1, t_2))\}$, that is, a tuple in $T_1$ qualifies if it does not join with any tuple in $T_2$; the left outer join can be defined as $T_1 \overset{\times}{\bowtie}_p T_2 = T_1 \bowtie_p T_2 \uplus T_1 \triangleright_p T_2$; the right outer join can be denoted by $T_1 \overset{\times}{\bowtie}_p T_2 = T_2 \overset{\times}{\bowtie}_p T_1$; and the full outer join can be represented as $T_1 X_p T_2 = T_1 \bowtie_p T_2 \uplus T_1 \triangleright_p T_2 \uplus T_2 \triangleright_p T_1$.

Moreover, as defined herein a tuple $t_1$ can be said to be subsumed by a tuple $t_2$ if they are defined on the same schema, provided that $t_1$ agrees with $t_2$ on all columns where they both are non-null, and $t_1$ contains fewer null values than $t_2$. Further, the operator removal of subsumed tuples of T, can be denoted by T↓, and returns the tuples of T that are not subsumed by any other tuple in T.

In addition, as utilized herein, the minimum union of tables $T_1$ and $T_2$ can be defined as $T_1 \oplus T_2 = (T_1 \uplus T_1)\downarrow$. Minimum unions have a lower precedence than joins, and it can be shown that minimum unions are both commutative and associative.

Further, it is assumed in what follows that base tables contain no subsumed tuples. This is usually the case in practice because base tables typically contain a unique key. Furthermore, it is also assumed herein that predicates are null-rejecting on all columns that they reference.

Referring now to FIG. 1, a system 100 that facilitates view matching for outer join views and/or queries is illustrated. The system 100 comprises an interface component 110 that receives a query expression that represents all or part of a query submitted by a user and conveys the query expression to a view-matching component 120. For example, the query can be received from a user by way of a graphical user interface, a keyboard, etc. The query expression received can comprise projections, selections, inner joins and outer joins (PSOJ), or any combination thereof.

Upon receipt of a query expression from the interface component 110, the view-matching component 120 determines whether the received query expression can be computed from one or more extant materialized views 130. The determination can be performed by first converting the query expression into join-disjunctive normal form, then matching the normalized query expression against the expressions defining the materialized views 130, which are also represented in join-disjunctive normal form, and finally outputting one or more substitute query expressions. The one or more materialized views 130, as employed herein, can be pre-computed results utilized to compute part or all of a query expression instead of computing a result of the query expression (or part thereof) each and every time from individual and separate base tables in the database. Moreover, the one or more materialized views 130 are generally pre-computed by a database administrator (e.g., a user, a developer, a personal computer, . . . ) who analyzes the transactions and queries occurring within a database over a period of time to determine whether certain query expressions occur sufficiently frequently as part of user queries to warrant creating and maintaining materialized views from which such query expression can be computed more efficiently than computing them from base tables. Once the database administrator has ascertained that certain query expressions have this characteristic, the database administrator can create the one or more materialized views 130.

In order to determine whether a received query expression can be computed from one of the existing materialized views 130, the view-matching component 120 can ascertain whether the query expression is subsumed by the materialized view under consideration. Further, the view-matching component 120 can determine whether all the terms required by the query expression can be recovered from the materialized view and can determine which query predicates, if any, can be applied to the materialized view to produce the correct set of tuples. Moreover, the view-matching component 120 can verify whether all the columns associated with such residual predicates and output expressions are available in the materialized view under consideration. If the foregoing have completed successfully, the view-matching component 120 can construct a substitute expression that is thereupon output as a substitute query expression.

Figure 2:
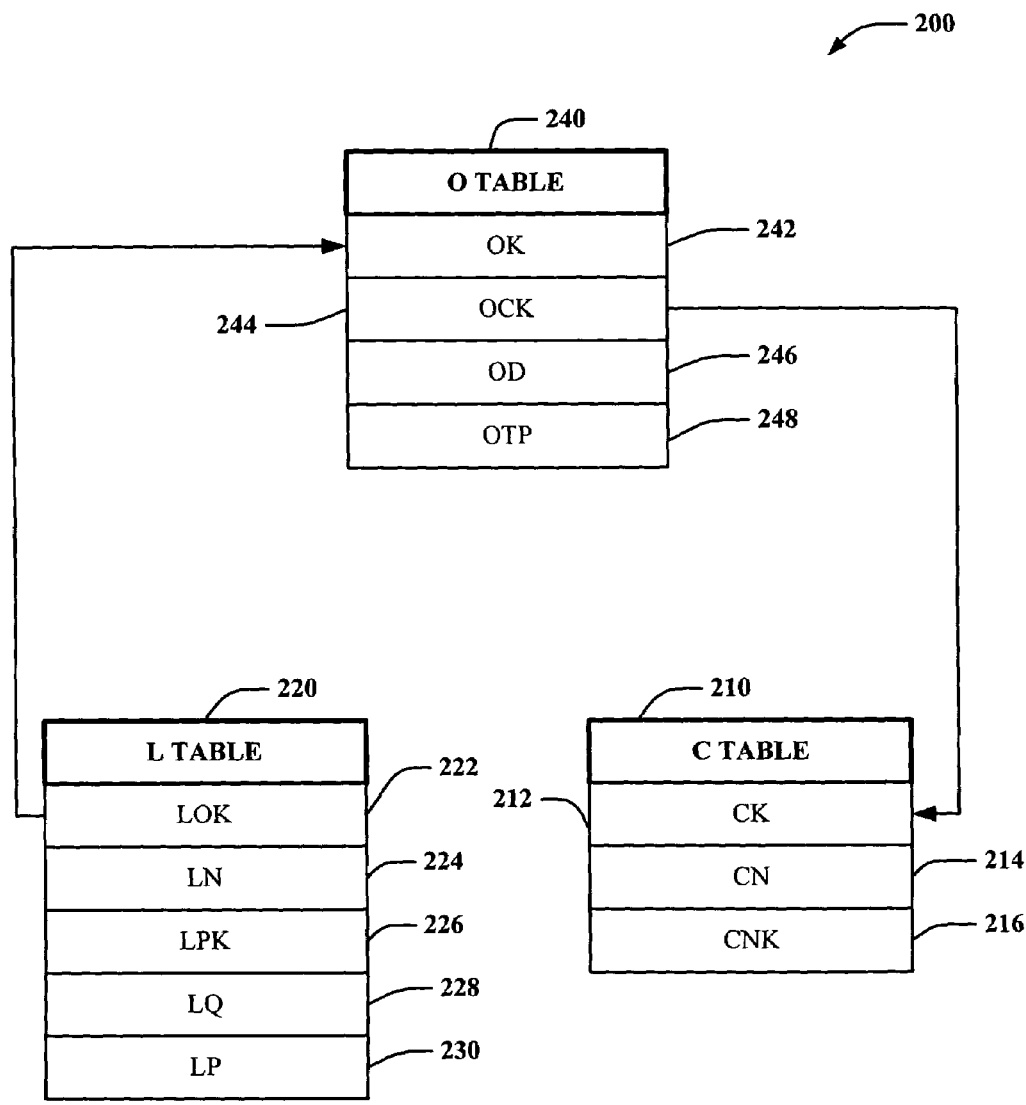
FIG. 2 illustrates an exemplary database as utilized by the subject invention.

Referring briefly to FIG. 2, depicted is an exemplary database 200 that will serve as an illustrative means to describe examples of one or more aspects of the subject invention. The database 200, for instance, can include three separate and individual base tables: C Table 210, L Table 220, and O Table 240. The C Table 210 can include, for example, the following columns: ck 212, cn 214, and cnk 216. Similarly, the L Table 220 can comprise the following columns: lok 222, ln 224, lpk 226, lq 228 and lp 70. Further, O Table 240 can comprise columns: ok 242, ock 244, od 246 and otp 248 respectively. Moreover, it will be noted that four columns, ck 212, lok 222, ln 224 and ok 242 are shaded to represent columns that form the key for each table. Additionally, two foreign key constraints are defined: ock 244 references ck 212 represented by an arrow that connects ck 212 with ock 244, and lok 222 references ok 242 represented by an arrow that connects ok 242 with lok 222. Furthermore, it should be noted in this exemplary database 200 that nulls are not allowed for any of the columns listed above.

Thus for example, based on the tables enumerated in FIG. 2, the result of the query expression $Q = C \bowtie_{ck=ock} (O \bowtie_{ok=lok} (\sigma_{lp>50K} L))$, which contains outer joins, may contain tuples of the following three types:

COL tuples, that is, tuples formed by concatenating a tuple from C Table, a tuple from O Table and a tuple from L Table. There will be one COL tuple for every L tuple that satisfies the predicate lp>50K.

CO tuples, that is, tuples composed by concatenating a tuple from Table C, a tuple from Table O and nulls for all columns of Table L. There will be one such tuple for every Table O tuple that does not join with any Table L tuple satisfying lp>50K.

C tuples, that is, tuples composed of a tuple from Table C with nulls for all columns of Table O and Table L. There will be one such tuple for every Table C tuple that does not join with any tuple in Table O.

The result effectively contains all tuples of $C \bowtie_{ck=ock} (O \bowtie_{ok=lok} (\sigma_{lp>50K} L))$, all tuples of $C \bowtie_{ck=ock} O$, and all tuples in Table C. Consequently, the expression $C \bowtie_{ck=ock} (O \bowtie_{ok=lok} (\sigma_{lp>50K} L))$ can be rewritten, as shown below, as the minimum union of three join terms comprised solely of inner joins which is in effect the join-disjunctive form of the original PSOJ expression:

$$Q = (C \bowtie_{ck=ock} O \bowtie_{ok=lok} (\sigma_{lp>50K} L)) \oplus (C \bowtie_p O) \oplus (C).$$

Figure 3:
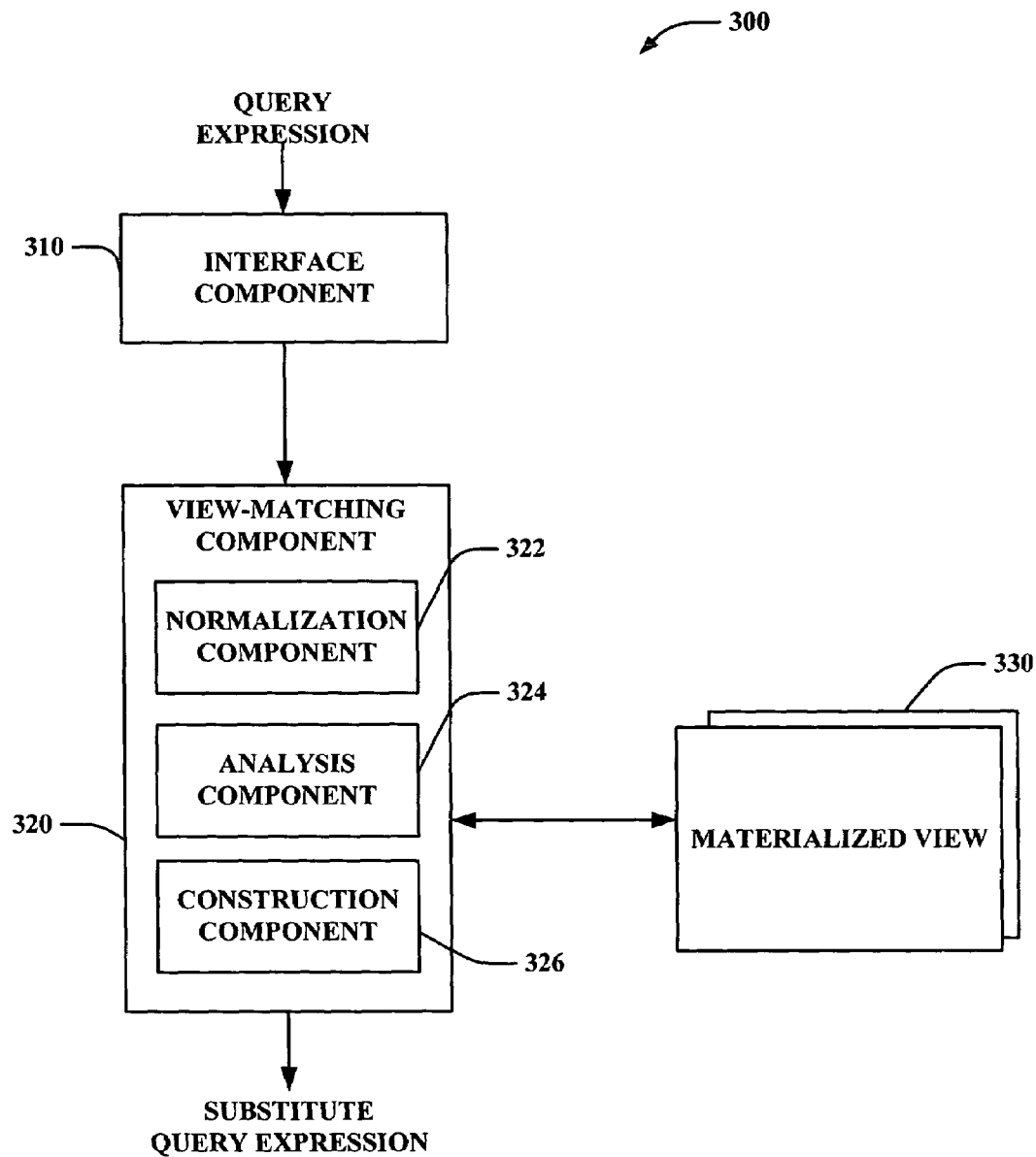
FIG. 3 illustrates a system for automatically facilitating view matching for outer join views and/or queries.

With reference now to FIG. 3, illustrated therein is a system 300 for automatically facilitating view matching for outer-join materialized views and query expressions. The system 300 comprises an interface component 310 and at least one materialized view 330 that can be substantially similar to the interface component 110 and materialized views 130 described with respect to FIG. 1. System 300 further includes a view-matching component 320 similar to that described in relation to view-matching component 120 described in relation to FIG. 1. The view-matching component 320 can include a normalization component 322, an analysis component 324, and a construction component 326. Though the normalization component 322, analysis component 324 and construction component 326 are represented as three distinct components, one conversant with the art will be cognizant that the functionality represented herein can be accomplished through a single component, or through combinations thereof.

In accordance with one aspect of the subject invention, the normalization component 322 can receive a query expression from the interface component 310, whereupon the normalization component 322 can convert the query expression and/or the one or more materialized views 330 into join-disjunctive normal form, through application of the following exemplary function:

---

Normalize(E)

---

Input: Expression E
Output TermSet
/* A term represents a PSJ expression and consists of a set of tables and a predicate */
Node = top node of E ;
Switch type of Node.Operator do
    case base table R:
        TermSet BT = { {R}, true};
        Return BT;
        /* Select has an input expression IE and a predicate
        SP */
    case select operator (IE, SP):
        TermSet IT = Normalize(IE);
        foreach Term t ∈ IT do
          if SP rejects nulls on a table not in t.Tables then
            IT = IT − {t};
          else
            t.Pred = t.Pred ∧SP;
        end
        return IT;
    /* Join has two input expressions (LE, RE), a predicate (JP) and a
    join type */
    case join operator (LE, RE, JP, JoinType):
        TermSet LT = Normalize(LE);
        TermSet RT = Normalize(RE);
        TermSet JT = ∅;        /* terms after join    */
        TermSet EL = ∅;        /* terms eliminated by
                              subsumption    */
        /* Multiply the two input sets */
        foreach Term l ∈ LT do
          foreach Term r ∈ RT do
            Term t = {(l.Tables ∪ r.Tables), l.Pred ∪ r.Pred ∪ JP};
            if !(JP rejects nulls on a table not in t.Tables) then
                JT = JT ∪ {t};
        /* Check whether all tuples in input term are subsumed by
        the result by */
        /* testing containment of PSJ expressions    */
            if $\sigma_{r.Pred}$(r.Tables) ⊆ $\sigma_{t.Pred}$(t.Tables) then
                EL = EL ∪ {r};
            end
          end
        end
    end
/* Add inputs from preserved side(s)    */
    switch JoinType do
        case full order:
            JT = JT ∪ LT ∪ RT; break;
        case left outer:

-continued

Normalize(E)

```
        JT = JT ∪ LT; break;
    case right outer:
        JT = JT ∪ RT; break;
    end
/* Discard terms eliminated by subsumption      */
JT = JT − EL;
Return JT
end
```

The function computes the join-disjunctive normal form of an expression by traversing the expressions operator tree from the bottom-up. The function exploits the following transformation rule to discard terms that are eliminated by null-rejecting predicates:

$$\sigma_{p(1)}(T_1 \bowtie_p T_2 \oplus T_2) = (\sigma_{p(1)}T_1) \bowtie_p T_2; \text{ if } p(1) \text{ is strong and references only } T_1$$

where $\sigma_{p(1)}$ is a selection operator and $p(1)$ is a predicate; $T_1$ and $T_2$ are tables or expressions; $\oplus$ denotes a minimum union; and $\bowtie$ denotes a full outer join. Additionally, the function eliminates terms by exploiting foreign keys. Thus, a term $\sigma_{p(1)}(T_1)$ can be eliminated from the normal form if there exists another term $\sigma_{p2}(T_2)$ such that $T_1 \subset T_2$ and $\sigma_{p1}(T_1) \subseteq \pi_{T_1^-} * \sigma_{p2}(T_2)$. This can occur, for instance, where the extra tables $(T_2-T_1)$ are joined in through foreign key joins. Consequently, since the terms are PSJ expressions, establishing whether the containment relationship $\sigma_{p1}(T_1) \subseteq \pi_{T_1^-} * \sigma_{p2}(T_2)$ holds is equivalent to the containment problem for PSJ expressions for which solutions are known.

Turning specifically now to the above function, the function recursively applies the following transformative rules (1)-(3) bottom-up to expand joins:

$$T_1 \bowtie_p T_2 = T_1 \bowtie_p T_2 \oplus T_1; \text{ if } T_1 = T_1 \downarrow \text{ and } T_2 = T_2 \downarrow \quad (1)$$

$$T_1 X_p T_2 = T_1 \bowtie_p T_2 \oplus T_1 \oplus T_2; \text{ if } T_1 = T_1 \downarrow \text{ and } T_2 = T_2 \downarrow \quad (2)$$

$$(T_1 \oplus T_2) \bowtie_p T_3 = T_1 \bowtie_p T_3 \oplus T_2 \bowtie_p T_3; \text{ if } T_3 = T_3 \downarrow \quad (3)$$

where $T_1$, $T_2$ and $T_3$ are tables; $\bowtie$ denotes the operator for a left outer join; $\bowtie$ denotes the operator for an inner join; $\oplus$ represents the operator for a minimum union; $T_1 \downarrow$ and $T_2 \downarrow$ represent the removal of subsumed tuples from tables $T_1$ and $T_2$; and X represents the operator for a full outer join. The normalization component 322 through exploitation of the function can further simplify the resulting expressions by applying the following transformative rules (4) and (5) and ensuring subsumption-containment as described infra.

$$\sigma_{p(1)}(T_1 \bowtie_p T_2 \oplus T_2) = (\sigma_{p(1)}T_1) \bowtie_p T_2; \text{ if } p(1) \text{ is strong and references only } T_1 \quad (4)$$

$$\sigma_{p(1)}(T_1 \bowtie_p T_2 \oplus T_1) = (\sigma_{p(1)}T_1) \bowtie_p T_2 \oplus (\sigma_{p(1)}T_1); \text{ if } p(1) \text{ references only } T_1 \quad (5)$$

The function on completion returns a set of terms (TermSet) corresponding to the normal form of the input expression, wherein each term is represented by a structure consisting of a set of tables (Tables) and a predicate (Pred).

For example, where the view expression, $V = C \bowtie_{ock=ck} (OX_{ok=lok}(\sigma_{lp<20}L)))$ is supplied to the above function, the function recursively descends the operator tree, and when applied to the innermost join, produces:

$$V = C \bowtie_{ock=ck} (\sigma_{1p<20 \land ok=lok}(O, L) \oplus \sigma_{1p<20}L \oplus O)$$

$$= C \bowtie_{ock=ck} (\sigma_{1p<20 \land ok=lok}(O, L) \oplus O)$$

because (a) the term $\sigma_{lp<20}L$ is subsumed by the term $\sigma_{lp<20^{\wedge}ok=lok}(O,L)$; and (b) the joins are a foreign key join, these terms are eliminated from the result. Next, the function is applied to the left outer join and produces the following normal form, wherein the term $\sigma_{lp<20^{\wedge}ock=ck}(C, L)$ is eliminated because the predicate ock=ck is null-rejecting on O and O is not a member of (C, L):

$$V = \sigma_{1p<20 \land ok=lok \land ock=ck}(C, O, L) \oplus \sigma_{1p<20 \land ock=ck}(C, L) \oplus$$

$$\sigma_{ck=ock}(C, O) \oplus C$$

$$= \sigma_{1p<20 \land ok=lok \land ock=ck}(C, O, L) \oplus \sigma_{ck=ock}(C, O) \oplus C$$

In another example, the following query QE and view VE expressions can be submitted to the function, then:

$$VE = \pi_{lok, ln, lq, lp, od, otp, ck, cn, cnk}(\sigma_{cnk<10}(C) \bowtie_{ock=ck} (\sigma_{otp>50}(O)X_{ok=lok}\sigma_{lq<100}(L))); \quad (I)$$

$$QE = \pi_{lok, lq, lp, od, otp}(\sigma_{otp>150}(O) \bowtie_{ok=lok} \sigma_{lq<100}(L)) \quad (II)$$

wherein $\sigma$ represents a selection operator, $\pi$ denotes a projection operator, $\bowtie$ represents a left outer join, X denotes a full outer join, and $\bowtie$ represents a right outer join, and lok, ln, lq, lp, od, otp, ok, ck, cn, cnk, ock represent columns in the tables C, O and L, described in relation to FIG. 2, above. The above function, in accordance with an aspect of the subject invention, converts the query QE and the view VE to the following expressions:

$$VE = \quad (III)$$
$$\pi_{lok, ln, lq, lp, od, otp, ck, cn, cnk}(\sigma_{cnk<10 \land ck=ock \land otp>50 \land ok=lok \land lq<100}(C, O, L) \oplus$$
$$\sigma_{cnk<10 \land ck=ock \land otp>50}(C, O) \oplus \sigma_{otp>50}(O) \oplus$$
$$\sigma_{otp<50 \land ok=lok \land lq>100}(O, L) \oplus \sigma_{lq<100}(L));$$

$$QE = \pi_{lok, lq, lp, od, otp}(\sigma_{otp>150 \land ok=lok \land lq=100}(O, L) \oplus \sigma_{lq<100}(L)) \quad (IV)$$

Once the normalization component 322 has completed converting the query and view expressions, the normalized expressions are conveyed to an analysis component 324. The analysis component 324 can undertake, for example, the following tasks: (1) check whether a query is subsumption-contained within the one or more materialized views 330; (2) determine whether all the terms contained in the query expression can be recovered from the one or more materialized views 330; (3) ascertain whether any residual predicates, (e.g., query predicates) should be applied to the one or more materialized views 330; and (4) determine whether all columns associated with the residual predicates and output expressions are available in the view output.

In order to check whether a query is subsumption-contained with the one or more materialized views 330, the analysis component 324 can check for containment of each term of the query against a term in the view. For instance, for a term $\sigma_{p1}(S)$ in the query, the analysis component 324 can locate a term $\sigma_{p2}(T)$ in the view such that $S \subseteq T$ and $p1 \Rightarrow p2$.

When computing a query from a view, an issue arises as to what operations the analysis component 324 can apply to the view. In this regard, though the subject invention is not so limited, the analysis component 324 may consider only transformations where a result tuple is computed from a single view tuple allowing for null substitution, (e.g., changing a column value to null). Thus, the analysis component 324 in effect decides whether a view contains sufficient tuples to compute the query expression.

Let T1 and T2 be two sets of tuples with the same schema. T1 can be defined as subsumption-contained in T2, denoted by $T1 \subset_s T2$, if for every tuple t1 in T1 there exists a tuple t2 in T2 such that t1=t2 or t1 is subsumed by t2. Similarly, an expression Q1 can be defined as subsumption-contained in an expression Q2 if the result of Q1 is subsumption-contained in the result of Q2 for every valid database instance.

Let Q1 and Q2 be two PSOJ expressions and Q1' and Q2' their corresponding join-disjunctive forms. Then $Q1' \subset_s Q2'$ provided that, for every term $\sigma_{p1}(S)$ in Q1', there exists a term $\sigma_{p2}(T)$ in Q2' such that $S \subseteq T$ and $\sigma_{p1}(S) \subseteq \pi_S * \sigma_{p2}(T)$.

For example, if the analysis component 324 were provided with the normalized query QE and view VE enumerated above as (III) and (IV), the analysis component 324 can find that the query term with base (O, L) in query QE has the same base as the fourth term in the view VE. However, to assure containment the analysis component 324 must verify that the following condition is satisfied (otp>150^ok=lok^lq<100) ⇒(otp>50^ok=lok^lq<100). Since the condition can be simplified to (otp<150)⇒(otp>50), the analysis component 324 can deduce that the view VE contains all tuples associated with the first term. In a similar manner, the analysis component 324 can detect that the second term of the query VE matches the last term of the query QE, i.e. $\sigma_{lq>100}(L)$ and deduce that the condition (lq<100)⇒(lq<100) is satisfied. Thus, the analysis component 324 can conclude that all the tuples required by this term of the query QE are contained in the view VE, and that the view VE contains all tuples necessary to compute the query QE.

The analysis component 324 upon determining that containment has been satisfied, can in addition determine whether the tuples of a term can be recovered from the view. This entails checking whether duplicate elimination is required by comparing hubs. Should it be determined that duplicate elimination is necessary, the analysis component 324 can locate a unique key of the term and ascertain whether the view outputs the specified/required columns. Additionally, the analysis component 324 can check whether the view outputs sufficient non-null columns to recover the tuples of the term.

At this stage the analysis component 324 has determined that a tuple t in the result of a term $\sigma_{p1}(S_1)$ can either occur explicitly in the result of the view or it can be subsumed by another tuple t' generated by a wider term $\sigma_{p2}(S_2)$, e.g., a term with the property $S_1 \subset S_2$, and in fact, the analysis component 324 can ascertain that there may be many tuples in the result that subsume t. Thus, in order to compute the query from the view, the analysis component 324 can recover a result from the view result.

For example, consider the following view and its normal form:

$$V = (\sigma_{cn<5}C)_{ock=ck}(O_{ok=lok}(\sigma_{lp>20}L))$$

$$= \sigma_{cn<5 \wedge lp<20 \wedge ok=lok \wedge ock=ck}(C, O, L) \oplus$$

$$\sigma_{cn<5 \wedge ck=ock}(C, O) \oplus \sigma_{cn<5}C$$

Thus, the analysis component 324 determines that the view consists of three types of tuples: COL tuples without null extension, CO tuples null extended on L, and C tuples null extended on O and L. Thus, if for example, recovery of tuples generated by the term $\sigma_{cn<5 \wedge ck=ock}(C, O)$ is desired, the analysis component 324 can realize that all the desired tuples are composed of a real C tuple and a real O tuple, i.e., they are not null-extended on C and O. The analysis component 324 can therefore apply the selection $\sigma_{\sim null(C) \wedge \sim null(O)}V$ to eliminate all tuples that do not satisfy this requirement. However, because the analysis component 324 will ascertain that due to the fact that no tuples of V are null-extended on C, the selection $\sigma_{\sim null(C) \wedge \sim null(O)}V$ can be simplified to $\sigma_{\sim null(O)}V$. The analysis component 324 can also ensure that tuples with the correct duplication factor have been obtained from the view. In other words, while still keeping with the example above, the analysis component 324 can be cognizant that a CO tuple $(t_c, t_o)$ that satisfies the predicate (cn<5^ck=ock) may have joined with one or more L tuples. Thus, the analysis component 324 can effectuate duplication elimination to remove duplicates; however in so doing, the analysis component 324 can also inadvertently remove legitimate duplicates. Consequently, in order to preserve legitimate duplicates the analysis component 324 can recover tuples depending on whether or not a unique key is available.

Where a unique key is available, the analysis component 324 can exploit the following relationship $\sigma_P(R) = \delta(\pi_{R1.}* _{,R2.}*, \ldots, _{Rn.}* \sigma_{\sim null(R1) \wedge \ldots \wedge \sim null(Rn)}V)$, wherein $\sigma_P(R)$, $R=\{R_1, R_2, \ldots, R_n\}$, is a term of a view V and $\sigma_P(R)$ has a unique key. Thus, for example, if the analysis component 324 were provided the following view expression where O does not have a unique key, and where the term $\sigma_{lp<20}O$ needs to be recovered from the view:

$$V = (\sigma_{1p<20}O) \bowtie_{ock=ck} (\sigma_{cn>5}C)$$

$$= \sigma_{cn<5 \wedge ock=ck \wedge 1p<20}(C, O) \oplus \sigma_{1p<20}O$$

In this instance the analysis component 324 need not apply duplicate elimination. To illustrate this, a tuple to in the result of $\sigma_{lp<20}O$ can be considered. The analysis component 324 can determine that the tuple may not join with any tuple in $\sigma_{cn<5}C$, as this occurs once in the view result (null extended on C). The analysis component 324 can further ascertain that if the tuple joins with a tuple $t_c$, the combined tuple $(t_o, t_c)$ will occur in the view result. However, because the join condition ock=ck corresponds to a foreign key constraint, the analysis component 324 can realize that it cannot join with more than one C tuple, and thus the analysis component 324 can determine that every tuple in $\sigma_{lp<20}O$ can occur at most once in the view result. Consequently, the analysis component 324 can conclude that no duplicate elimination is needed and that the tuples can be recovered by $\sigma_{lp<20}O = \pi_{O.}* \sigma_{\sim null(O)}V$.

The foregoing example further illustrates the case with a single extension join. An extension join as used herein is an equijoin matching a foreign key constraint where the foreign key columns are declared non-null and reference a unique key, thus an extension join merely extends each input tuple with additional columns.

When the analysis component 324 is presented with a query expression where a unique key is not available, the analysis component 324 can utilize the following relationship $\sigma_P(R) = \pi_{R1.}* _{,R2.}*, \ldots, _{Rn.}* \sigma_{\sim null(R1) \wedge \ldots \wedge \sim null(Rn)}V$, wherein $\sigma_P(R)$, $R=\{R_1, R_2, \ldots, R_n\}$, can be a term in the view V, and a hub of $\sigma_P(R)$ is the smallest subset S of R such that every table in R−S is joined in through a sequence of extension joins. The expression is valid provided that for every term $\sigma_q(T)$ in the normal form of V such that $R \subset T$, there is a hub equal to the hub of $\sigma_P(R)$. Thus the analysis component 324 can check whether duplicate elimination is necessary by comparing hubs.

Thus far, it has been assumed that the view outputs at least one non-null column for every table in R. However, the analysis component 324 can determine what should be done in case the view outputs a non-null column for only a subset of the tables. In this instance the analysis component 324 can utilize the following relationship:

$$\sigma_{\neg null(R_1)\char`^\neg null(R_2)\char`^\ldots\char`^\neg null(R_n)}V = \sigma_{\neg null(S_1)\char`^\neg null(S_2)\char`^\ldots\char`^\neg null(S_m)}V$$

wherein $\sigma_P(R)$, $R=\{R_1, R_2, \ldots, R_n\}$, is the set of source tables of a term of a view V, and $S=\{S_1, S_2, \ldots, S_m\}$, is a subset of R with the property that the view outputs one or more non-null columns for each table in S. The relationship is valid for every term $\sigma_q(T)$ in the normal form of V such that $T \subset R$, and the set $(R-T) \cap S$ is non-empty. In this manner the analysis component 324 can ascertain whether the view outputs sufficient non-null columns.

For example, if the query QE and view VE, equations (I)-(IV) above, are supplied to the analysis component 324, the analysis component 324 can determine that the view VE references tables C, O, and L (FIG. 2) and outputs at least one non-null column from each table. The analysis component 324 can also realize that C.ck, O.otp and L.ok can be utilized as non-null columns since C.ck is a primary key and as such is non-null, and O.otp and L.lq are referenced by null-rejecting predicates. Utilizing this analysis the analysis component 324 can determine that the first term of the query QE matches the fourth term of the view VE. Thus, the analysis component 324 can determine that the hub of the fourth term of the view VE is {L} because the join between the L and O matches a foreign key constraint and the foreign key column L.lok is declared non-null. The COL term (the first term) of the view is the only term whose base is a superset of {O, L}. The analysis component 324 can further deduce that the hub of the COL term is also {L} because the join between O and C is also a foreign key join. Thus, the analysis component 324 will determine that no duplicate elimination is needed.

Furthermore, the analysis component 324 can determine that the fourth term references tables O and L, thus R={O, L} and S={O, L} when analyzing the fourth term of the view VE. Additionally, the analysis component 324 can determine that the third and fifth terms of the view VE have bases that are subsets of R, and that the third term has base T={O}. The analysis component 324 can therefore compute that the set $(R-T) \cap S = (\{O, L\} - \{O\}) \cap \{O, L\} = \{L\}$ is non-empty. Similarly, the analysis component 324 can deduce that since the fifth term has base T={L}, the set $(R-T) \cap S = (\{O, L\} - \{L\}) \cap \{O, L\} = \{O\}$ is non-empty. Therefore, the analysis component 324 can extract the tuples in the fourth term of the view VE using the predicates O.otp≠null and L.lq≠null. As for the second term of the query QE, the analysis component 324 can determine that the second term of query QE matches the last term of the view VE since the hub of the last term is {L}. Thus, since the analysis component 324 has already determined that the hub of the first and fourth terms of the view VE is also {L} the analysis component 324 can deduce that no duplication elimination is necessary since the terms in the first and fourth terms in the view VE are terms whose base is a superset of {L}.

In relation to the last term of the view VE, the analysis component 324 can conclude that since the last term of the view has base {L}, the view does not contain any terms whose base is a subset of {L} and thus extraction of the tuples of this term can be accomplished by using the predicate L.lq≠null. At this juncture the analysis component 324 will have determined that the required tuples can be extracted from the view VE as follows:

$$\sigma_{otp>50\char`^ok=lok\char`^lq<100}(O,L) = \sigma_{otp\neq null\char`^lq\neq null}V\, \sigma_{lq<100}(L)$$
$$= \sigma_{lq\neq null}V$$

At this point the analysis component 324 has, subsequent to receipt of join-disjunctive normal forms of the query and view expression from the normalization component 322, checked whether the normalized query is subsumption-contained within the normalized view, and checked whether all the terms in the normalized query are recoverable from the normalized view. The analysis component 324 can now determine the query predicates, e.g., residual predicates, to be applied to the normalized view. The analysis component 324 accomplishes determining residual query predicates by exploiting equivalences among columns in the view result and by eliminating predicate terms that are already enforced by the view predicate. The analysis component 324 therefore can employ the following relationship, where a query term has a conjunctive normal form predicate $P_q = p_1 \char`^ p_2 \char`^ \ldots \char`^ p_n$ and a corresponding view term has a predicate $P_v$, to imply that the conjunct $p_i$ of the query predicate can be eliminated if $P_v \Rightarrow p_i$, i.e., if $p_i$ already holds for all tuples generated by the appropriate term in the view. Thus, for example, if the analysis component 324 were presented with the join-disjunctive normal query from equation (IV) above, the analysis component 324 can generate the following three implications regarding the first term:

$(otp>50\char`^ok=lok\char`^lq<100) \Rightarrow (otp>150)$     [a]

$(otp>50\char`^ok=lok\char`^lq<100) \Rightarrow (ok=lok)$     [b]

$(otp>50\char`^ok=lok\char`^lq<100) \Rightarrow (lq<100)$     [c]

Given these implications, the analysis component 324 can ascertain that implications [b] and [c] are valid while implication [a] is not valid. The analysis component 324 therefore can conclude that the residual predicate for the first term equals (otp>150). Similarly, the analysis component 324 can generate the implication $(lq<100) \Rightarrow (lq<100)$ for the second term of the join-disjunctive normal query from equation (IV) above, and determine that no further predicate needs to be applied for the second term.

The analysis component 324 can also determine whether all the columns required by the residual predicates and output expression are available in the view output. The analysis component 324 can facilitate this by exploiting column equivalences. A column equivalence class is a set of columns that are known to have the same value in all tuples produced by an expression and can typically be generated by column equality predicates such as equijoin conditions. The analysis component 324 realizing that a PSOJ expression can consist of multiple PSJ terms, each one with its own equivalence classes, can exploit these equivalence classes in the residual predicates.

For instance, if the analysis component 324 were to receive the view VE explicated above as equation (IV), the analysis component 324 can ascertain that only three terms have the following non-trivial equivalence classes: {{ck, ock}, {ok, lok}} for the first term, {{ck, ock}} for the second term, and {{ok, lok}} for the fourth term. Similarly, were the analysis component 324 to receive the query QE elucidate above as equation (III), the analysis component 324 can conclude that only the first term has a non-trivial equivalence class, namely, {{ok, lok}}. Based on this knowledge the analysis component 324 can determine whether all required columns are available.

In the case of the exemplary view VE and query QE mentioned above, the analysis component 324 can deduce that the columns available in the view VE are lok, ln, lq, lp, od, otp, ck, cn and cnk. The analysis component 324 can therefore ascertain that, since the first term of query QE has one residual predicate (otp>150) and there exists a corresponding column in the view VE, the residual predicate can be applied. A similar analysis undertaken by the analysis component 324 on the second term of the query QE would conclude that the second term requires no residual predicates. Further, the analysis component 324 can ascertain that the query output columns necessary to resolve the query QE and the view VE, are lok, lq, lp, od and otp, all of which are available as corresponding view output columns, and thus that all the columns necessary to construct a substitute expression are available.

The analysis component 324 having (i) determined whether join-disjunctive query and view are subsumption-contained, (ii) ascertained whether all the terms in the join-disjunctive query can be recovered from the join-disjunctive view, (iii) determined the residual predicates that are necessary to exploit the join-disjunctive view; and (iv) checked whether all the columns required by the residual predicates and the output expressions are available in the view output, can convey the join-disjunctive normalized query to the construction component 326 in the knowledge that the join-disjunctive normalized query can be computed from the join-disjunctive normalized view, and that a substitute query expression can be constructed.

The construction component 326 can receive the join-disjunctive normalized query from the analysis component 324 and thereupon commences constructing a substitute expression. In order to accomplish this, the construction component 326 (1) can recover the source PSJ term of the query by utilizing a selection with the appropriate null and ~null predicates as determined by the analysis component 324, and where necessary applying duplicate elimination; (2) if any residual predicates still exist, the construction component 326 can restrict the result using a selection with the appropriate residual predicates; and (3) the construction component 326 can apply projection without duplicate elimination to reduce the result to the required output columns. In this endeavor, the construction component 326 can, where necessary, exploit query equivalence classes, and return null for any output column originating from a table not in the base of the term.

For example, with reference to the view VE and query QE provided by equations (I)-(IV) supra, but herein denoted as view $V_1$ and query $Q_1$, the construction component 326 can render the following result as the join-disjunctive normal query:

$$Q_1 = \pi_{lok,lq,lp,od,otp}(\sigma_{otp>150}(\sigma_{otp\neq null \wedge lq\neq null}V_1)) \oplus$$

$$\pi_{lok,lq,lp,null,null}(\sigma_{lq\neq null}V_1)$$

$$= \pi_{lok,lq,lp,od,otp}(\sigma_{otp>150 \wedge lq\neq null}V_1) \oplus$$

$$\pi_{lok,lq,lp,null,null}(\sigma_{lq\neq null}V_1)$$

Here the construction component 326 can add the innermost selection of each term to perform tuple recovery as described above in relation to the analysis component 324. From the foregoing query $Q_1$, the analysis component 346 can determine that no duplicate elimination is necessary, and that the selection $\sigma_{otp>150}$ supplies the residual predicate necessary for the first term. Staying with the exemplary query $Q_1$ the construction component 326 can replace the columns od and otp with nulls in the projection operator of the second term so as to output tuples of the correct form. The construction component 326 can further deduce that the first part of the query expression $Q_1$ can be simplified by combining the two selections and discarding the predicate otp≠null because the predicate (otp>150) is null rejecting on otp, thus finalizing the construction of a substitute expression in join-disjunctive normal form.

Figure 4:
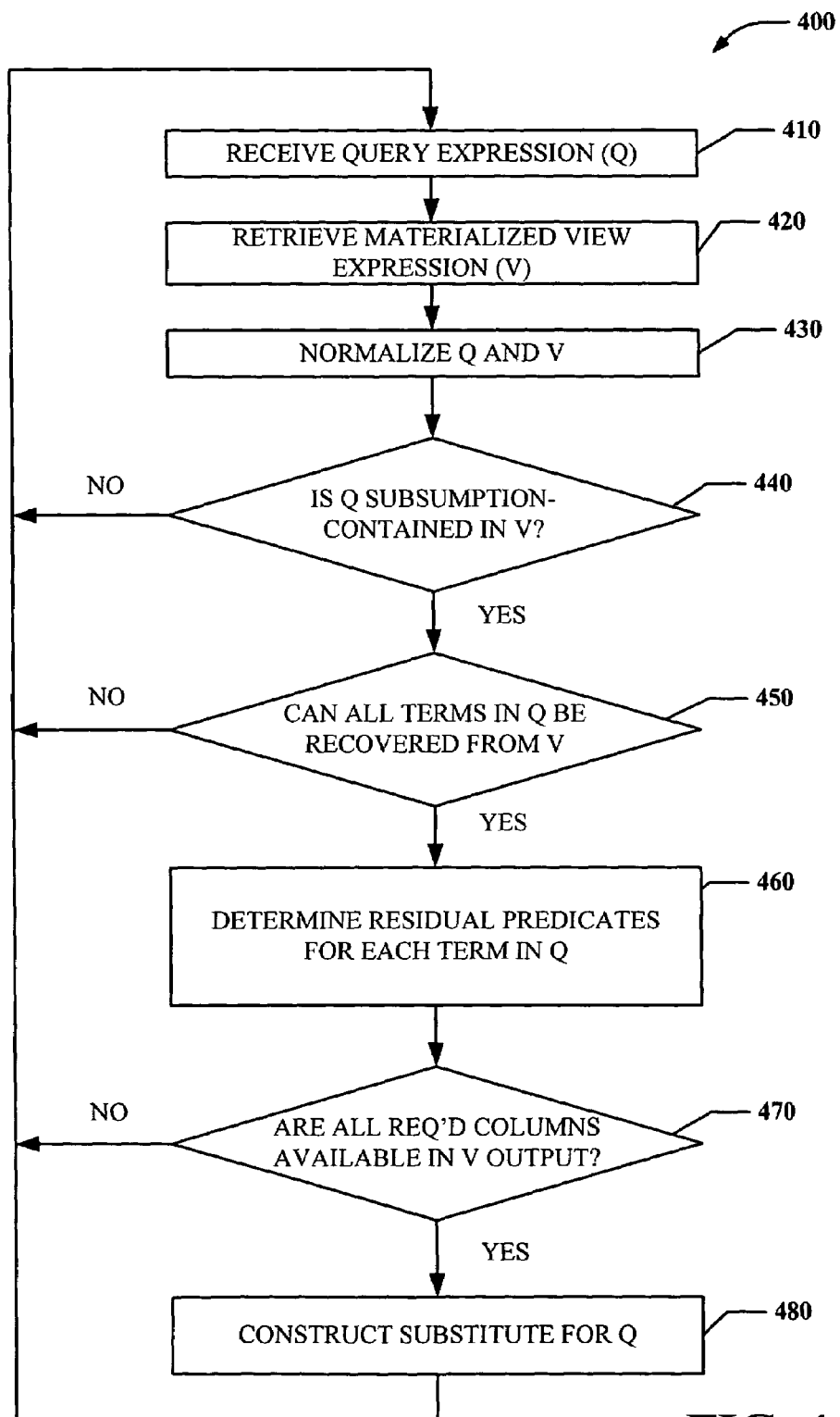
FIG. 4 illustrates a method for computing a query from a materialized view.
Figure 5:
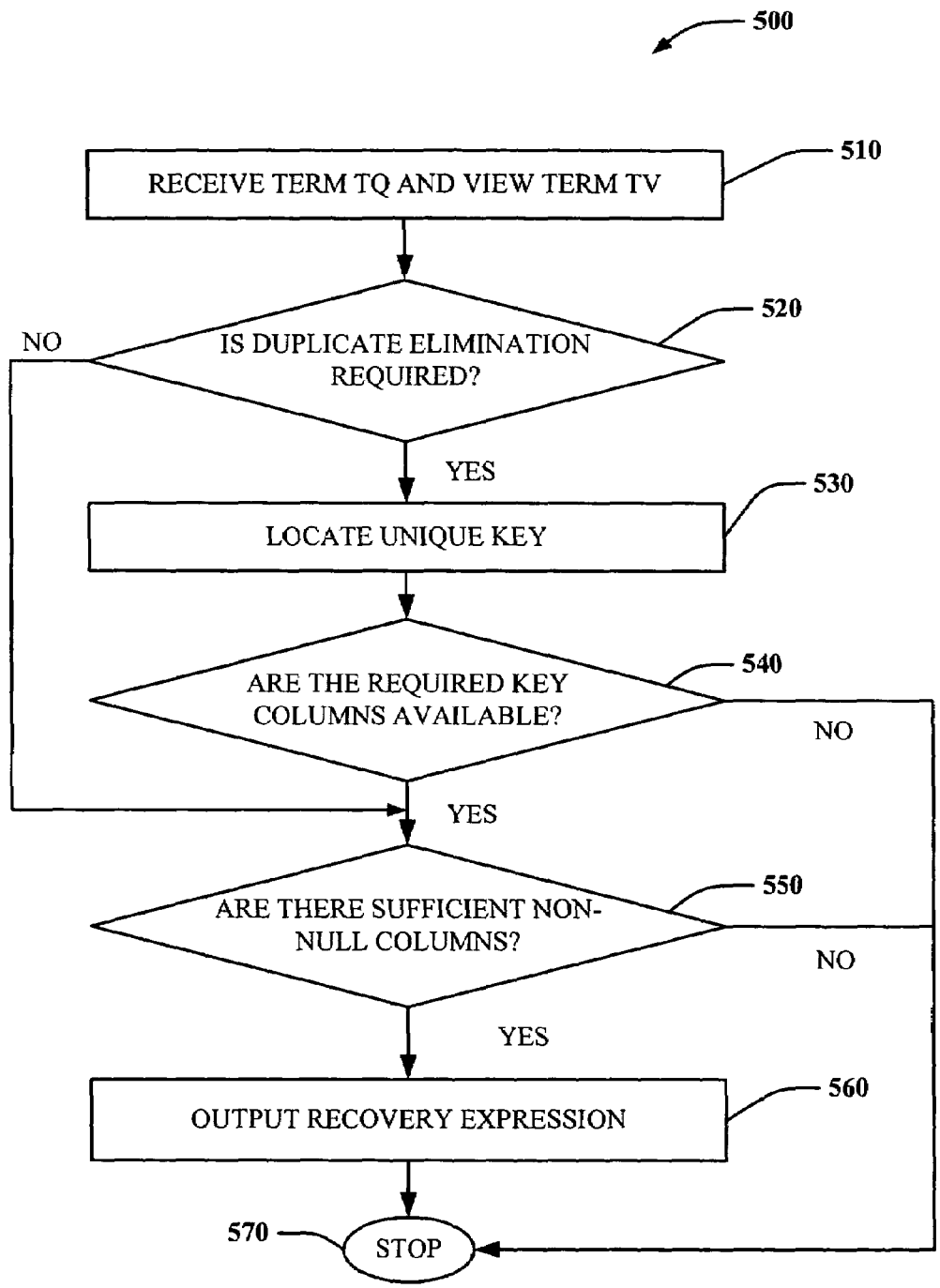
FIG. 5 illustrates a method for checking whether the tuples of a term can be recovered from a view.
Figure 6:
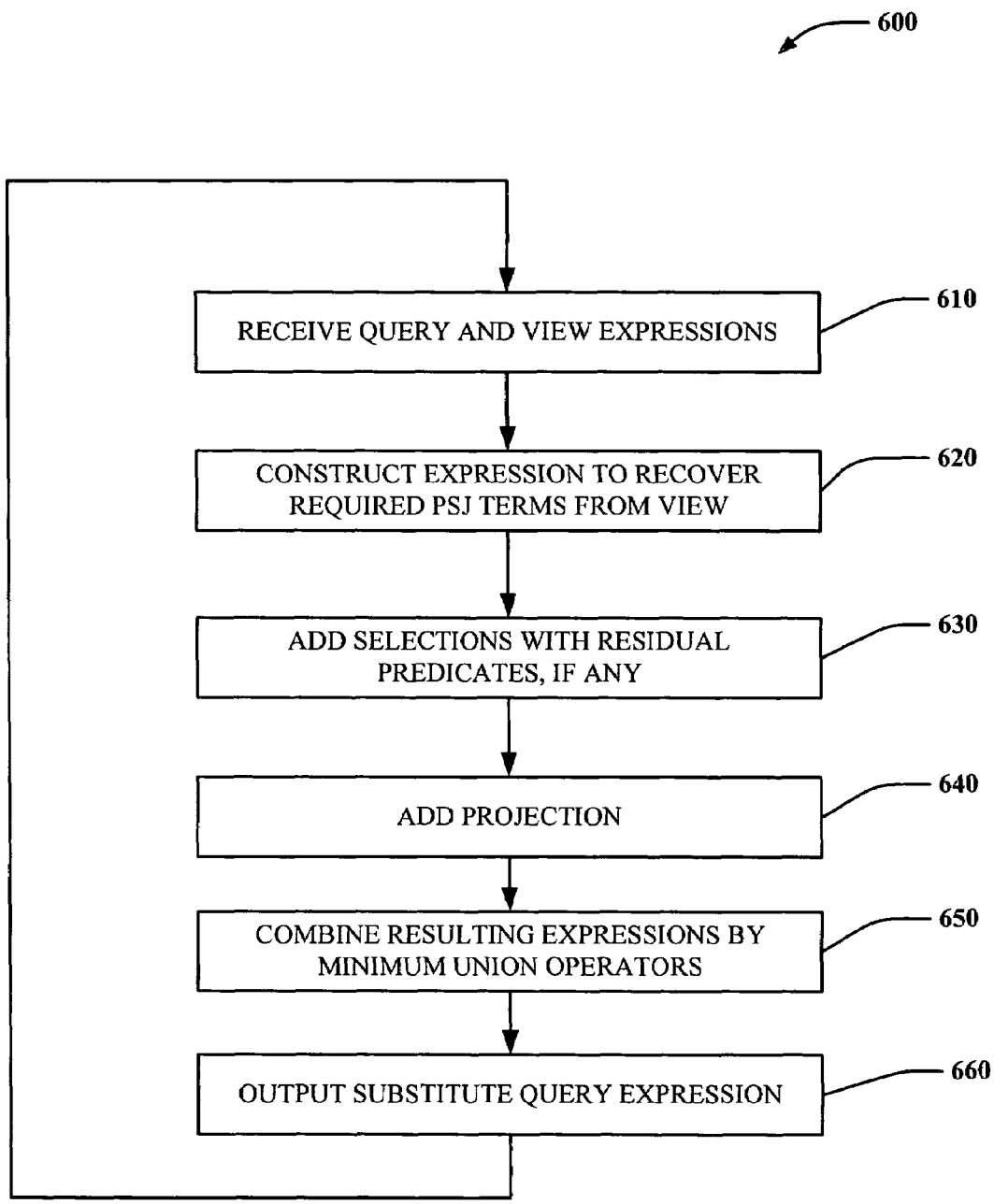
FIG. 6 illustrates a method for constructing a substitute join-disjunctive normalized query expression.

With reference to FIGS. 4-6, therein are illustrated flowcharts in accordance with aspects of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Referring now to FIG. 4, there is illustrated a methodology 400 for computing a query from a materialized view in accordance with an aspect of the subject invention. At 410 a query expression (Q) is received. The query expression (Q) can be received, for example, from a user or a query optimizer component. The query expression (Q) can comprise a whole user query, or parts thereof. The query expression can further comprise one or more database operators, such as, for example selection, projection, and join operators. At 420 the method can retrieve an expression defining a materialized view (V). At 430 the query expression and the materialized view expression (V) can be converted into join-disjunctive normal form as discussed supra. At 440 a determination is made as to whether the query (Q) is subsumption-contained within the view (V) as discussed above. Where however, the determination is negative at 440, the methodology returns to 410 to await the receipt of another query (Q). If at 440 the determination is affirmative, the methodology verifies whether all the terms in the query (Q) can be recovered from the materialized view (V) at 450. If the result of the verification at 450 is negative, the method can return to act 410 to await another query (Q). If however the verification determines that all terms in the query (Q) expression can be recovered from the view (V), the methodology determines at 460 which residual predicates, if any, should be applied to the view (V). At 470 a determination is made as to whether all the columns required by the residual predicates and output expressions are available in the view output. Where the result of the determination at 470 is affirmative, the methodology facilitates the construction of an optimized substitute expression at 480. Where on the other hand the determination at 470 yields a negative result, the methodology can return to act 410.

Referring now to FIG. 5, there is illustrated is a method 500 for checking whether the tuples of a term in a normalized query expression can be recovered from a given term in the normalized view expression in accordance with the subject invention. At 510 a term of a normalized query expression (TQ) and a subsuming term of a normalized view expression (TV) are received whereupon at 520 a determination as to whether duplicate elimination is necessary is made. This entails computing the hubs and comparing the hubs of terms TQ and TV. If the two hubs are equal, duplicate elimination is not required and the method proceeds to 550. If it is ascertained at 520 that duplicate elimination is necessary, a unique key of the query term TQ is determined at 530. Methods for computing unique keys of a PSJ expression are well established in the literature. At 540 a determination is made as to whether the view outputs the columns of the unique key. If at 540 it is determined that the view does not output the columns of the unique key, the required tuples cannot therefore be recovered from the view and thus the method terminates at 570. At 550 the method ascertains whether the view outputs sufficient null columns. If at 550 it is determined that the view does not output sufficient null columns, the method proceeds to 570 and terminates. Otherwise, where acts 540 and 550 respond positively an expression that recovers all tuples of view term TV is established and the method terminates at 570.

Referring now to FIG. 6, there is illustrated a methodology 600 for constructing a substitute expression in accordance with the subject invention. At 610 a join-disjunctive normalized query expression is received. At 620 the view terms matching the terms of the query are recovered utilizing a selection with the appropriate null and ~null predicates, and where necessary, duplicate elimination is undertaken. At 630 selections with the appropriate residual predicates, if any, are added. At 640 a projection without duplicate elimination is added to reduce the result to the required output columns. Further at 650, minimum-union operators can be utilized to combine the resulting expressions into a single expression to construct a substitute query expression. At 660 the constructed substitute query expression is output.

Figure 7:
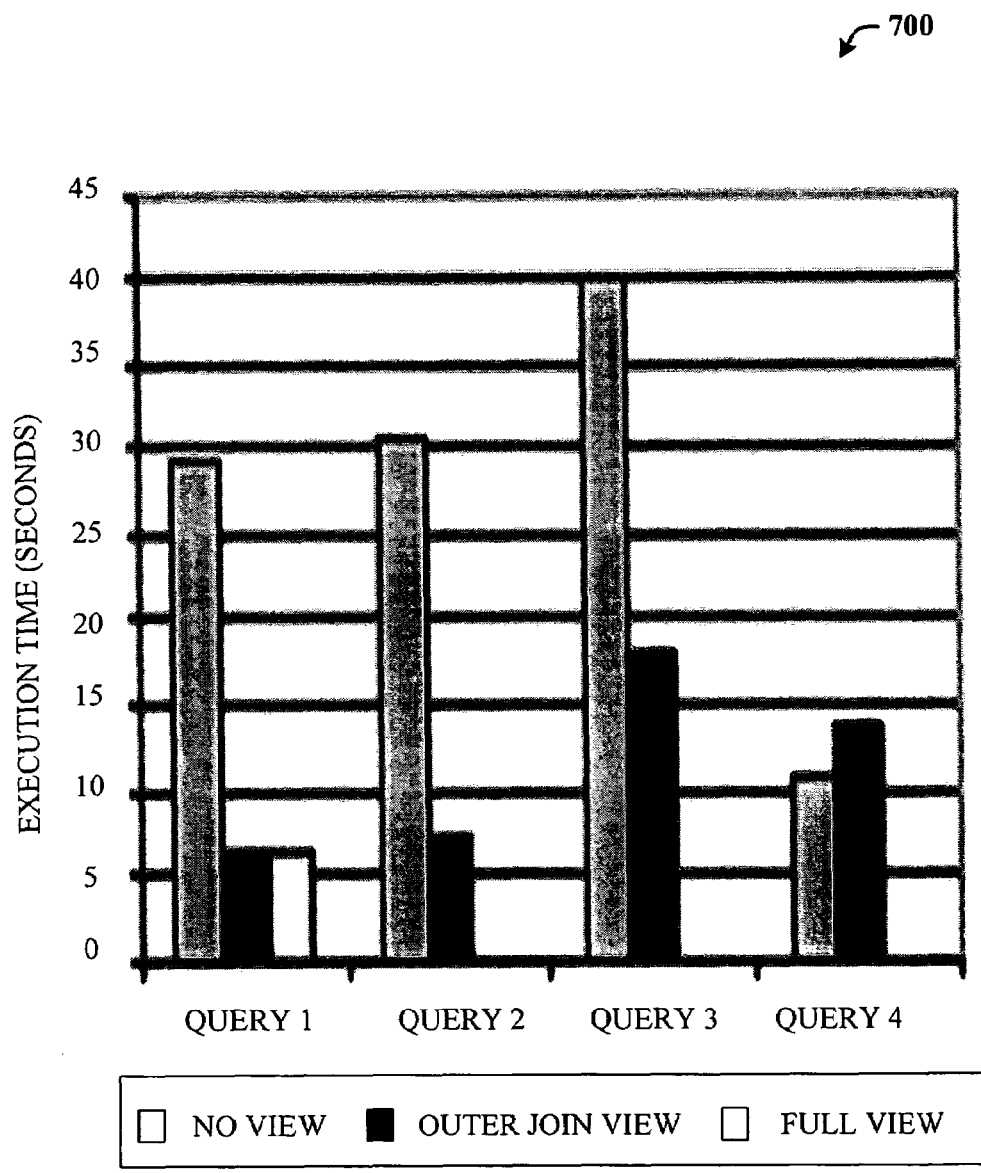
FIG. 7 illustrates an exemplary performance graph depicting one or more aspects of the subject invention.

Referring briefly to FIG. 7, an exemplary graph 700 illustrating one or more aspects of the subject invention is shown. Graph 700 depicts a comparison between performance of original queries with that of their corresponding substitute expressions that compute the query result from a materialized view. In particular, as can be discerned from the graph 700, execution time is significantly less with respect to queries associated with outer join views that are computed by way of one or more aspects of the subject invention.

Figure 8:
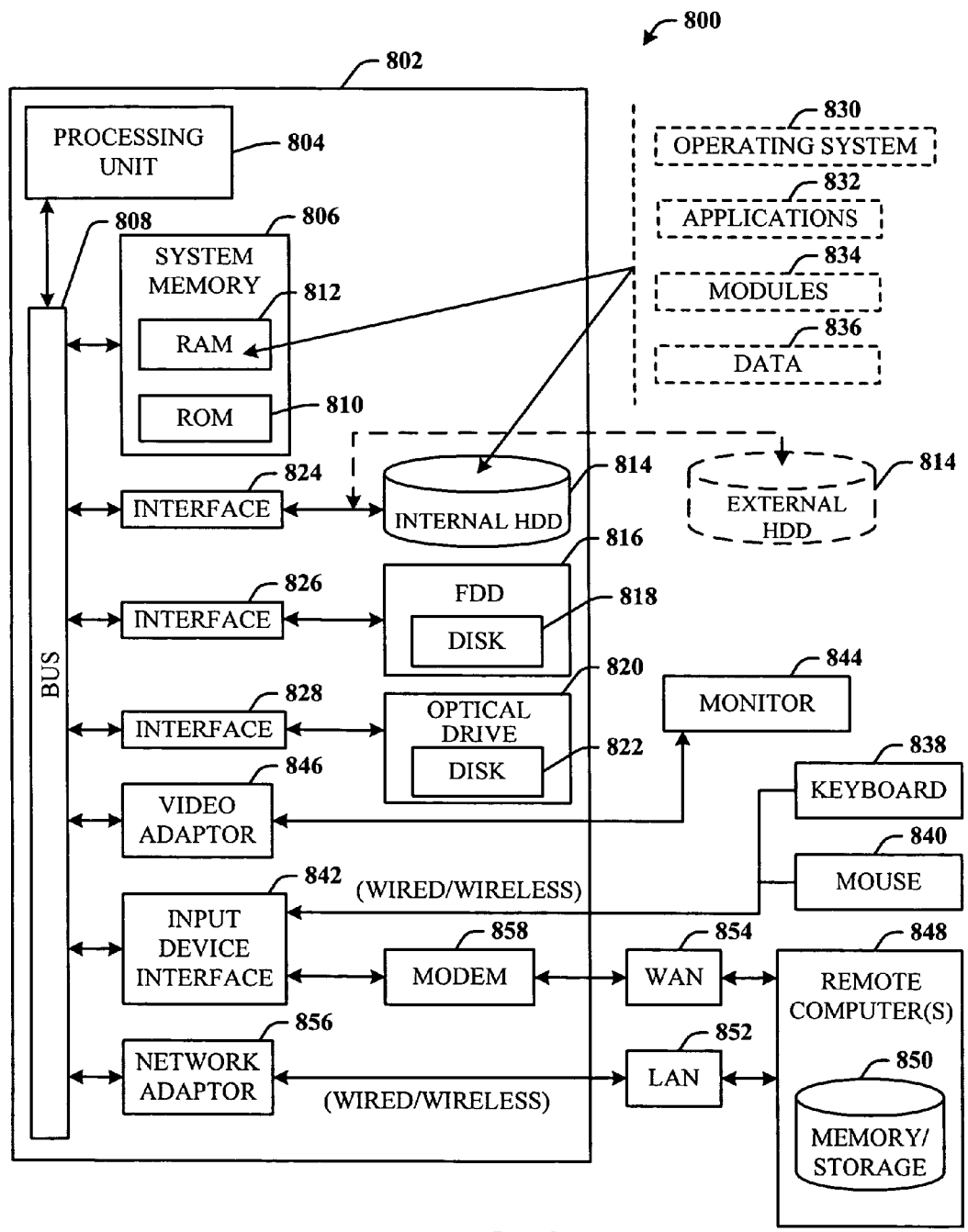
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects of the subject invention, FIG. 8 and the following discussion are intended to provide a brief, general description of a suitable computing environment 800 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, there is illustrated an exemplary environment 800 for implementing various aspects of the invention that includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the subject invention can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices, and companies, and facilitate enterprise-wide computer networks, such as intranets, all of which may connect to a global communication network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856. When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
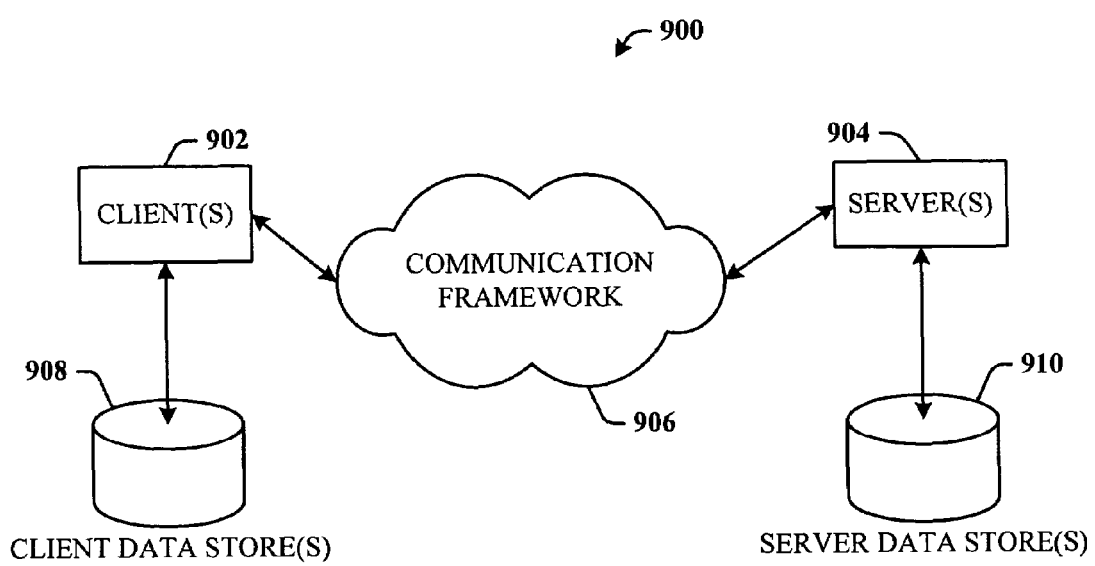
FIG. 9 illustrates a schematic block diagram of an exemplary computing environment in accordance with the subject invention.

Referring now to FIG. 9, there is illustrated a schematic block diagram of an exemplary computing environment 900 in accordance with the subject invention. The system 900 includes one or more client(s) 902. The client(s) 902 can be hardware and/or software (e.g., threads, processes, computing devices). The client(s) 902 can house cookie(s) and/or associated contextual information by employing the subject invention, for example. The system 900 also includes one or more server(s) 904. The server(s) 904 can also be hardware and/or software (e.g., threads, processes, computing devices). The servers 904 can house threads to perform transformations by employing the subject invention, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising a processor that facilitates view matching for outer join views, comprising:
    an interface component that receives at least one query expression that includes one or more outer join operators;
    one or more materialized views defined by expressions composed of at least one or more of project ($\pi$), select ($\sigma$), inner join and outer join operators; and
    a view-matching component that converts the at least one query expression and outputs a substitute query expression, comprising;
        a normalization component that converts the at least one query expression and at least one materialized view expression into a normalized query expression and a normalized view expression;
        an analysis component that receives the normalized query expression and the normalized view expression, the analysis component effectuates duplicate elimination where a unique key is available by verifying that each view term $\sigma_P(R)$ required by a term in the normalized query expression can be recovered from the normalized view through utilization of expressions of the form $\sigma_P(R)=\delta(\pi_{R1.^*,R2.^*,\ldots,Rn.^*}\sigma_{\square null(R1)^{\hat{}} \ldots \hat{}\square null(Rn)}V)$, wherein $R=\{R_1, R_2, \ldots, R_n\}$ is a set of source tables of a term in the normalized view V, P represents a predicate, $\delta$ denotes an operator that removes duplicates, R1.*, R2.*, ..., Rn.* connote all columns in tables R1, R2, ..., Rn of the normalized view, ^ represents an AND operator, and ~null(R1) ... ~null(Rn) are predicates testing that the columns of R1, ..., Rn are not null; and
        a construction component that constructs the substitute query expression by recovering a source term of the normalized query expression using the selection operator with an appropriate null and not null predicate and where necessary applying duplicate elimination, where necessary utilizing the selection operator with appropriate residual predicates to restrict a result, applying the projection operator without duplicate elimination to reduce the result to one or more required output columns, exploiting one or more equivalence classes, and returning null for the one or more required output columns that originate from a table not contained in a base of the term.

2. The system of claim 1, the analysis component determines whether the normalized query expression is subsumption-contained in the normalized view expression.

3. The system of claim 1, the analysis component effectuates term recovery where a unique key is unavailable by verification that each view term $\sigma_P(R)$ required by a term in the normalized query expression can be recovered from the normalized view through employment of expressions of the form $\sigma_P(R)=\delta(\pi_{R1.^*,R2.^*,\ldots,Rn.^*}\sigma_{\square null(R1)^{\hat{}} \ldots \hat{}\square null(Rn)}V$, provided that for every term $\sigma_q(T)$ in the normalized view V where $R \subset T$ has a hub equal to the hub of $\sigma_P(R)$, wherein $R=\{R_1, R_2, \ldots, R_n\}$ is a set of source tables of term $\sigma_P(R)$ in the normalized view V, and the hub of $\sigma_P(R)$ is the smallest subset S of R such that each table in R−S is joined in through a sequence of extension joins, P and q are predicates, R1.*, R2.*, ..., Rn.* connote all columns containing the term in tables R1, R2, ..., Rn of the normalized view, ^ represents an AND operator, and ~null(R1) ... ~null(Rn) are predicates testing that the columns of R1, ..., Rn are not null.

4. The system of claim 1, the analysis component determines a minimal set of columns needed to extract terms in the normalized query expression from the normalized view through exploitation of an equivalence of the form $$\sigma_{\square null(R_1)^{\hat{}}\square null(R_2)^{\hat{}}\ldots \hat{}\square null(R_n)}V = \sigma_{\square null(S_1)^{\hat{}}\square null(S_2)^{\hat{}}\ldots \hat{}\square null(S_m)}V$$

wherein $R=\{R_1, R_2, \ldots, R_n\}$, is the set of source tables of a term in the normalized view V, and $S=\{S_1, S_2, \ldots, S_m\}$ is a subset of R with the property that the normalized view outputs one or more non-null columns for each table in S and the equivalence is applied provided that for every term $\sigma_q(T)$ in the normalized view such that $T \subset R$, the set $(R-T) \cap S$ is non-empty.

5. The system of claim 1, the analysis component determines whether one or more residual query predicate terms should be applied to the normalized view.

6. The system of claim 5, the analysis component verifies that one or more columns required by the one or more residual query predicate terms and one or more output expressions are output by the normalized view.

7. A computer implemented method that facilitates view matching for outer join views, comprising:
    receiving by an interface component at least one query, the at least one query comprising at least one of a selection operator ($\sigma$), a predicate, a projection operator ($\pi$), and a join operator;
    retrieving one or more materialized view expressions;
    converting by a view-matching component the at least one received query and the one or more materialized views to a normalized query expression and a normalized view expression, wherein the converting comprising,
        converting by a normalization component the at least one query expression and at least one materialized view expression into a normalized query expression and a normalized view expression;
        receiving by an analysis component the normalized query expression and the normalized view expression, the analysis component effectuates duplicate elimination where a unique key is available by verifying that each view term $\sigma_P(R)$ required by a term in the normalized query expression can be recovered from the normalized view through utilization of expressions of the form $\sigma_P(R)=\delta(\pi_{R1.^*,R2.^*,\ldots,Rn.^*}\sigma_{\square null(R1)^{\hat{}} \ldots \hat{}\square null(Rn)}V)$, wherein $R=\{R_1, R_2, \ldots, R_n\}$ is a set of source tables of a term in the normalized view V, P represents a predicate, $\delta$ denotes an operator that removes duplicates, R1.*, R2.*, ..., Rn.* connote all columns in tables R1, R2, ..., Rn of the normalized view, ^ represents an AND operator, and ~null(R1) ... ~null(Rn) are predicates testing that the columns of R1, ..., Rn are not null; and
        constructing by a construction component that constructs a substitute query expression by recovering a source term of the normalized query expression using the selection operator with an appropriate null and not null predicate and where necessary applying duplicate elimination, where necessary utilizing the selection operator with appropriate residual predicates to restrict a result, applying the projection operator without duplicate elimination to reduce the result to one or more required output columns, exploiting one or more equivalence classes, and returning null for the one or more required output columns that originate from a table not contained in a base of the term.

8. The method of claim 7, further comprising determining whether the normalized query expression is subsumption-contained in the normalized view expression.

9. The method of claim 7, further comprising determining one or more residual query predicate to be applied to the normalized view.

10. The method of claim 7, further comprising ascertaining whether one or more columns utilized by one or more residual query predicates and one or more output expressions are available in the materialized view.

11. The method of claim 7, the converting utilizes transformative rules that comprise at least one of: $T_1 \bowtie_p T_2 = T_1 \bowtie_p T_2 \oplus T_1$, if $T_1 = T_1 \downarrow$ and $T_2 = T_2 \downarrow$; $T_1 X_p T_2 = T_1 \bowtie_p T_2 \oplus T_1 \oplus T_2$, if $T_1 = T_1 \downarrow$ and $T_2 = T_2 \downarrow$; $(T_1 \oplus T_2) \bowtie_p T_3 = T_1 \bowtie_p T_3 \oplus T_2 \bowtie_p T_3$, if $T_3 = T_3 \downarrow$; $\sigma_{p(1)}(T_1 \bowtie_p T_2 \oplus T_2) = (\sigma_{p(1)} T_1) \bowtie_p T_2$, if $p(1)$ is strong and references only T1; and $\sigma_{p(1)}(T_1 \bowtie_p T_2 \oplus T_1) = (\sigma_{p(1)} T_1) \bowtie_p T_2 \oplus (\sigma_{p(1)} T_1)$, if $p(1)$ references only T1 wherein T1, T2, T3 are one or more tables, p and p(1) are a predicates, $\bowtie$ denotes a left outer join, $\bowtie$ denotes an inner join, X denotes a full outer join, $\oplus$ denotes a minimum union between the one or more tables, and $\downarrow$ denotes the operator for removal of one or more subsumed tuples.

12. A computer storage medium having stored thereon computer instructions executed by a processor to facilitate view matching for outer join views, comprising:

receiving by an interface component at least one query, the at least one query comprising at least one of a selection operator ($\sigma$), a predicate, a projection operator ($\pi$), and a join operator;

retrieving one or more materialized view expressions;

converting by a view-matching component the at least one received query and the one or more materialized views to a normalized query expression and a normalized view expression, wherein the converting comprising, converting by a normalization component the at least one query expression and at least one materialized view expression into a normalized query expression and a normalized view expression;

receiving by an analysis component the normalized query expression and the normalized view expression, the analysis component effectuates duplicate elimination where a unique key is available by verifying that each view term $\sigma_P(R)$ required by a term in the normalized query expression can be recovered from the normalized view through utilization of expressions of the form $\sigma_P(R) = \delta(\pi_{R1.*, R2.*, \ldots, Rn.*} \sigma_{\square null(R1)^{\wedge} \ldots \square null(Rn)} V)$, wherein $R = \{R_1, R_2, \ldots, R_n\}$ is a set of source tables of a term in the normalized view V, P represents a predicate, $\delta$ denotes an operator that removes duplicates, R1.*, R2.*, ..., Rn.* connote all columns in tables R1, R2, ..., Rn of the normalized view, ^ represents an AND operator, and ~null(R1)...~null(Rn) are predicates testing that the columns of R1, ..., Rn are not null; and constructing by a construction component that constructs a substitute query expression by recovering a source term of the normalized query expression using the selection operator with an appropriate null and not null predicate and where necessary applying duplicate elimination, where necessary utilizing the selection operator with appropriate residual predicates to restrict a result, applying the projection operator without duplicate elimination to reduce the result to one or more required output columns, exploiting one or more equivalence classes, and returning null for the one or more required output columns that originate from a table not contained in a base of the term.

* * * * *